|   | United States Patent [19] | [11] | 3,766,785 |
|---|---|---|---|
|   | Smernoff | [45] | Oct. 23, 1973 |

[54] AUTOMATIC PIPETTE

[75] Inventor: Ronald B. Smernoff, Belmont, Calif.

[73] Assignee: Analytical Products, Inc., Belmont, Calif.

[22] Filed: May 17, 1971

[21] Appl. No.: 143,841

[52] U.S. Cl. .............................................. 73/425.6
[51] Int. Cl. .............................................. B01l 3/02
[58] Field of Search ................. 73/425.4 R, 425.4 P, 73/425.6; 128/218 C, 218 A; 222/386; 141/27

[56] References Cited
UNITED STATES PATENTS

| 3,343,539 | 9/1967 | Moorhouse ...................... 73/425.6 |
| 2,817,562 | 12/1957 | Fleming et al. ..................... 92/155 |
| 3,244,009 | 4/1966 | Tietje ................................ 73/425.6 |
| 3,494,201 | 2/1970 | Roach .............................. 73/425.6 |
| 3,248,014 | 4/1966 | Gill .................................. 73/425.6 |
| 2,844,148 | 7/1958 | Raife .............................. 128/218 C |
| 3,302,462 | 2/1967 | Pursell ........................... 73/425.4 P |
| 3,162,217 | 12/1964 | Poli ................................ 128/218 C |

*Primary Examiner*—S. Clement Swisher
*Attorney*—Norman E. Reitz

[57] ABSTRACT

A positive action pipette for conviently and accurately drawing and delivering liquids in quantities ranging from about one microliter to several milliliters is disclosed. The positive action of the pipette enables the operator to draw and deliver small quantities of liquids without exercising judgement or employing great dexterity. The positive action is achieved by means of a shaft member with an attached volume calibration nub which rides in calibration channels formed in the inner wall of the tubular housing of the pipette. The length of the calibration channels define drawing displacements and discharge displacements and, in one embodiment, an ejection displacement. The firm and positive ride of the shaft member within the tubular housing enables the operator to quickly and cleanly draw and discharge liquid from the disposable tip portion of the pipette. After discharge of the liquid, in one embodiment, the disposable tip may be ejected by moving the shaft member through an ejection displacement by guiding the volume calibration nub longitudinally along an ejection channel. High accuracy is achieved by minimizing the compressible air column interspaced between the tip of a plunger and the liquid being drawn into a disposable tip and by minimizing the number of critical sealing points so air leaks are substantially eliminated. The air column is minimized by means of a precision plunger assembly containing a precision plunger which rides in a precise friction fit within a precision molded bore composed of a resilient material. Air leaks are minimized because the only critical seals are the precise friction fit and the press fit of the disposable tip onto the end of the plunger assembly. An elongated disposable tip fits over the end of the plunger assembly to receive the liquid. When very small amounts of liquid, e.g., 10μl are drawn into the disposable tip it is advantageous if the disposable tip is adapted to receive the precision plunger. The shape of the tip is such that if it receives the precision plunger it does so with a minimal air column between the liquid and the tip of the plunger. The precision plunger is retractable at least partially within the plunger assembly. The ride of the volume calibration nub in the calibration channels is controlled by lining up an indicator, e.g., a line or an arrow on the shaft member with indicator markings, e.g., lines on the top of the tubular housing.

9 Claims, 8 Drawing Figures

United States Patent [19]
Smernoff
[11] 3,766,785
[45] Oct. 23, 1973
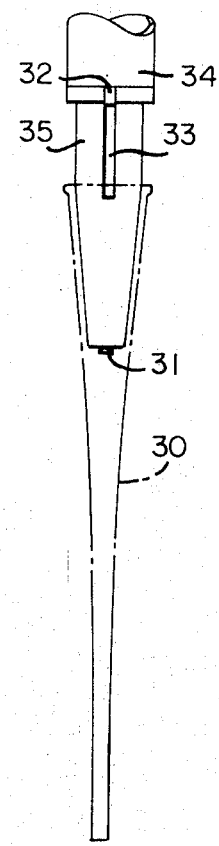

PATENTED OCT 23 1973 3,766,785

INVENTOR.
RONALD B. SMERNOFF
BY *Robert Wahl*
ATTORNEY

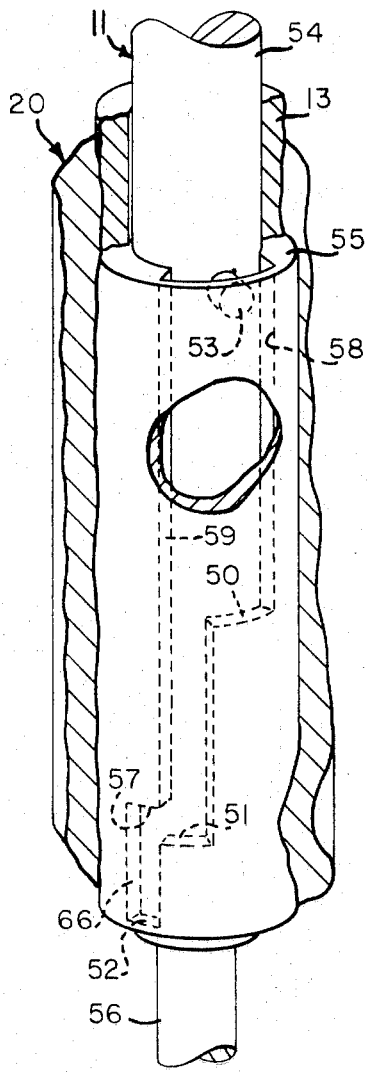
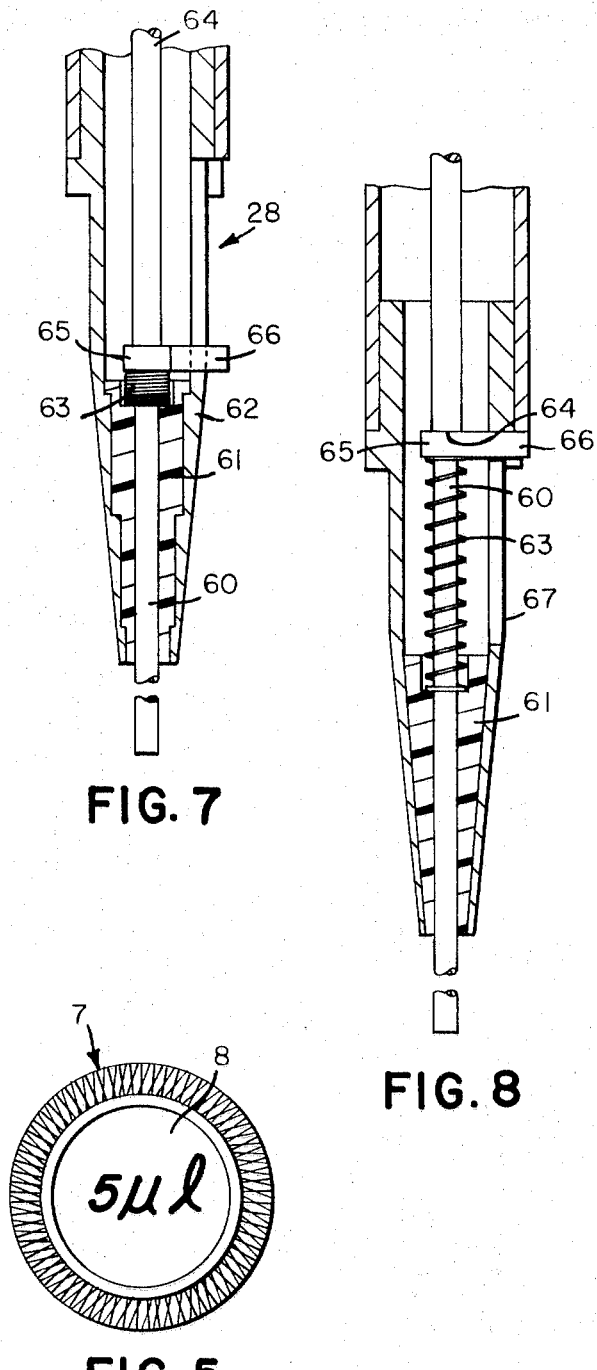
FIG. 6
FIG. 7
FIG. 8
FIG. 5
INVENTOR.
RONALD B. SMERNOFF
BY Hubert L. Dahl
ATTORNEY

AUTOMATIC PIPETTE

BACKGROUND OF THE INVENTION

My invention relates to a pipette usable with disposable tips for drawing and delivering liquids and, more particularly, to an automatic pipette for quickly and accurately drawing and delivering liquids in precise quantities ranging from about 1 microliter to several milliliters.

Classical pipettes have required the operator to exercise his judgement in determining when a particular amount of liquid has been drawn into the body of the pipette. For example, the meniscus of a liquid column is aligned with a mark imprinted upon glass tubing. Or, a syringe is filled so that the liquid within the syringe lines up with a mark on the body of the syringe. Pipettes such as these which require the exercise of human judgement are unsuitable for extremely accurate pipetting (unless fragile capillary tubes or very precise bore tubing are used) or for applications in which large numbers of uncontaminated liquid samples must be drawn and delivered in a short period of time, e.g., in medical laboratory applications and in industrial quality control applications.

Automatic pipettes have been developed which permit the repetitive drawing and delivery of liquids in small quantities. These automatic pipettes have been suitable for certain applications but have not achieved great accuracy for several reasons. In U.S. Pat. No. 3,494,201 issued to W. J. Roach, a pipetting system is disclosed in which a drawing displacement is defined by the length of the unimpeded movement of a shaft member within a tubular housing. The discharge displacement is defined by the distance that a calibration collar on the shaft member can compress a stiff compression spring. Human judgement is required, i.e., pressure on the thumb operating the shaft member is sensed, to determine the point at which the drawing displacement terminates (the point at which the stiff compression spring is encountered) and the point at which the discharge displacement terminates (the point at which the stiff compression spring can be compressed no further). Variability in the manual dexterity of the operator can cause variations in the amount of liquid drawn and displaced. Further inaccuracy of delivery can be introduced by the compressibility of the relatively large air column within the tubular housing above the liquid being drawn. Still further, because the O-ring seal is within the tubular housing and because of the modular nature of the apparatus there are several critical seals where air leaks can occur.

An additional problem with automatic pipettes is that they may become contaminated from repetitive usage. The use of disposable tips has helped but has not completely solved this problem. Contamination occurs because the plunger is sealed to the housing by means of an O-ring but this seal, being of nearly zero width, is not of sufficient length to protect the interior of the pipette from contamination.

It is therefore an object of this invention to provide an automatic pipette for accurately drawing and delivering liquids in small quantities which does not require the exercise of human judgement in evaluating the quantity being drawn.

It is also an object of this invention to provide an automatic pipette which accurately draws and delivers liquids in small quantities.

It is a further object of this invention to provide an automatic pipette which is suitable for repetitive usage and does not become contaminated.

It is a still further object of this invention to provide an automatic pipette having only a minimum number of critical sealing surfaces so that the possibility of air leaks is minimized.

It is a yet further object of this invention to provide an automatic pipette usable with disposable tips wherein the compressible air column between the tip of the pipette plunger and the top of the liquid column being drawn is kept to a minimum.

SUMMARY OF THE INVENTION

My invention comprises an elongated, automatic and portable pipette which can be hand operated without the exercise of human judgement to insure the accuracy of the volume being drawn. The bottom of a shaft member longitudinally moveable within a tubular housing and extending above the upper end thereof is connected to a precision plunger assembly. The precision plunger assembly comprises a precision molded bore and a precision plunger which rides in the bore in a smooth but precise friction fit. A volume calibration nub extends radially from the shaft member and fits into calibration channels formed in the inner wall of the tubulary housing. The length of the calibration channels defines a drawing displacement and a discharge displacement and, in one embodiment, an ejection displacement for the movement of the shaft member within the tubular housing and the movement of the precision plunger attached to the shaft member. By varying the configuration of the calibration channels in the tubular housing the versatility of the automatic pipette can be enhanced, e.g., the volume calibration nub can be switched from channel to channel at will if the channels are configured in interconnected side-by-side relation.

The shaft member is normally held in a ready position by means of a compression spring which biases the shaft member with respect to the tubular housing. When the shaft member is moved downwardly into the tubular housing the compression spring is compressed and the precision plunger is displaced. The friction fit of the precision plunger in the precision molded bore protects the inner works of the automatic pipette from contamination. When the shaft member is moved downwardly as far as possible the precision plunger can, and especially when a small volume is to be taken up often will, extend beyond the end of the precision molded bore. A disposable tip can be placed over the end of the precision plunger assembly, said tip being configured to receive the precision plunger. The disposable tip is fabricated so that a minimal air column exists between the bottom of the plunger and the top of the liquid column being drawn into the disposable tip.

In one embodiment a tip ejector slide rides freely on the precision plunger within the precision plunger assembly and serves to eject the disposable tip after it has been used. A finger portion of the tip ejector slide extends externally from the precision plunger assembly through an ejector slide raceway formed in the assembly. As the precision plunger moves to its farthest downward position in the disposable tip a shoulder constructed on the precision plunger will push the ejector slide so that the finger portion touches the edge of the disposable tip and flicks it off of the precision plunger assembly. The position of the volume calibration nub with respect to the calibration channels is indicated by the alignment of an indicator, e.g., a line or an arrow on the shaft member with indicating marks on the top of the tubular housing. This permits the operator to control the mode in which the pipette is operating.

BRIEF DESCRIPTION OF THE DRAWINGS

For more detailed understanding of the automatic pipette of my invention reference may be had to the accompanying drawings which are hereby incorporated in and made a part of this specification:

FIG. 5 is a plan view of the handle means attached to the upper end of the shaft member and illustrating a thumb recess as well as the volume marking for a given pipette.

FIG. 6 is a cut-away perspective view of the upper portion of the tubular housing illustrating the volume calibration nub and one configuration for the calibration channels.

FIG. 7 is a detailed sectional view of the precision plunger assembly illustrating the position at which the tip ejector slide is fully extending downwardly by action of the shoulder on the precision plunger.

FIG. 8 is a further detailed sectional view of the tip ejector slide, the shoulder of the precision plunger and the ejector compression spring, and the ejector slide raceway formed in the precision plunger assembly.

DESCRIPTION OF THE PREFERRED EMBODIMENT

Figure 1:
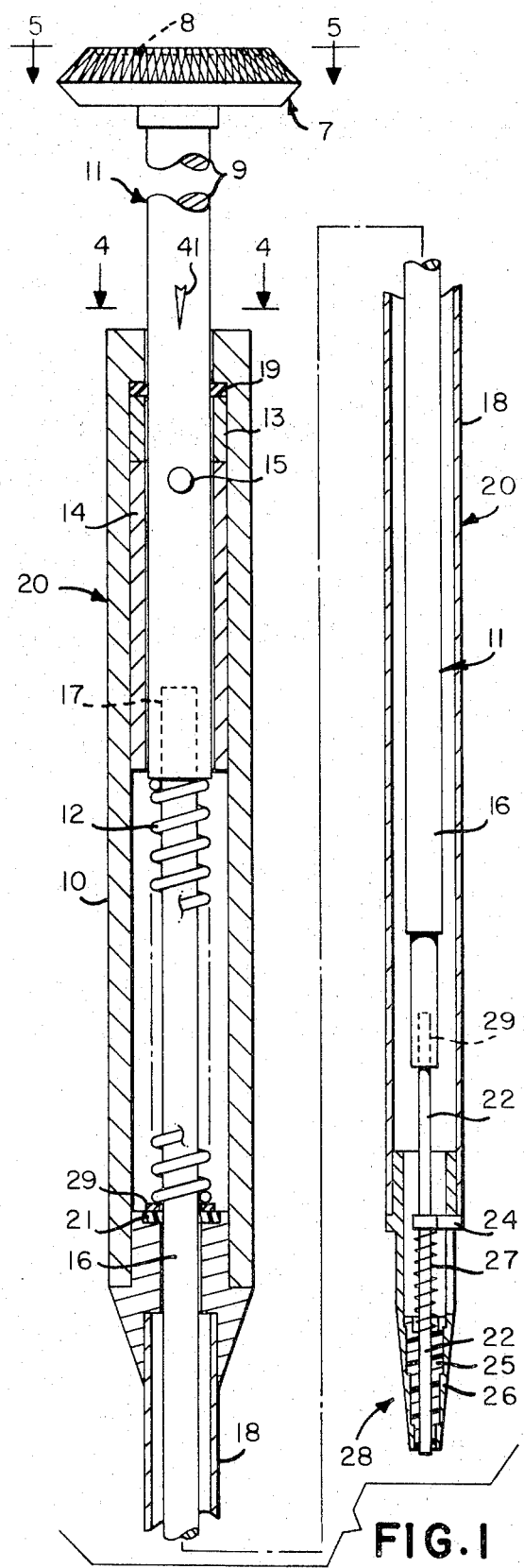
FIG. 1 is a sectional view of the upper portion of the automatic pipette of my invention illustrating the tubular housing, the shaft member, the compression spring, the volume calibration nub, and the precision plunger assembly including the precision plunger, the precision molded bore and a tip ejector slide.

Referring now to FIG. 1 it can be seen that the upper portion 9 of shaft member 11 rides freely within the upper portion 10 of tubular housing 20. Upper portion 9 of shaft member 11 is guided by means of teflon asher 19. Lower portion 16 of shaft member 20 is guided by means of teflon washer 21. A metal washer 29 is used to protect teflon washer 21 from damage by the end of spring 12. Volume calibration nub 15 is shown to extend radially from the surface of upper portion 9 of shaft member 11. Spacer 13 serves as a stop to the upward movement of volume calibration nub 15.

Shaft member 11 is seen to be constructed of upper portion 9 and lower portion 16. Extension 17 of the lower portion 16 of shaft member 11 is press-fitted into the upper portion 9 of shaft member 11. The upper portion 9 of shaft member 11 is biased with respect to tubular housing 20 by means of compression spring 12. Compression spring 12 returns shaft member 11 to a normal ready position, a position defined by the abutting of volume calibration nub 15 against spacer 13. Compression spring 12 also provides a constant upward force in opposition to the movement of shaft member 11 through its various displacements.

The upper portion 10 of tubular housing 20 is seen to be connected with the lower portion 18 of tubular housing 20. The elongated configuration of lower portion 18 of tubular housing 20, shown also in FIG. 1, permits the automatic pipette of the invention to be inserted into centrifuge tubes, flasks, beakers, test tubes and the like to draw and discharge a sample liquid.

FIG. 1 also illustrates the bottom portion of the automatic pipette of the invention. The lower portion 16 of shaft member 11 is shown to receive the upper extension 29 of precision plunger 22 in a press-fit. Precision plunger assembly 28 is comprised of precision molded bore 25, precision plunger 22 and a lower extension 26 of tubular housing 20 shaped to receive a disposable tip in a press-fit. A tip ejector slide 24 is also shown to ride freely on precision plunger 22. Compression spring 27 is shown as a means of biasing tip ejector slide 24 with respect to precision molded bore 25.

The operation of the accurate volume calibration feature of the present invention is shown in FIG. 6. Volume calibration nub 53 extends radially from portion 54 of shaft means 11 and is shown in perspective as it rides within calibration channels formed in the inner wall of portion 55 of tubular housing 20. A drawing displacement is defined by the distance along the edge 58 to ledge 50. A discharge displacement is defined by the distance along edge 59 to ledge 51. And a tip ejection displacement is defined by the sum of the discharge displacement and the distance along edge 66 to ledge 52.

In operation, a disposable tip is positioned in press-fit over the end of the precision plunger assembly and shaft member 11 is moved from the ready position to the position at which volume calibration nub 53 rests on ledge 50. This moves the precision plunger in the precision molded bore through the drawing displacement. The disposable tip is then inserted into the liquid from which a sample is to be taken. Alternatively the disposable tip can be inserted in the liquid before shaft member 11 is used to move calibration nub 53 to ledge 50. Shaft member 11 is next returned to the ready position thereby returning the precision plunger through the drawing displacement and drawing a column of liquid into the disposable tip. Shaft member 11 is twisted slightly clockwise so that volume calibration nub 53 lines up with the discharge channel. The automatic pipette is then removed to a location where the disposable tip is inserted into a container disposed to receive the same liquid. Shaft member 11 is then moved through the discharge displacement to the position at which volume calibration nub 53 rests on ledge 51 thereby discharging the liquid contained in the disposable tip. At this point, in the embodiment shown in FIG. 6, shaft member 11 is twisted slightly clockwise so that volume calibration nub 53 is moved into the ejection channel. Shaft number 11 is then moved downwardly to the point that volume calibration nub 53 rests on ledge 52. The finger portion of the tip ejector slide will flick the disposable tip off the precision plunger assembly at this point. Then the natural action of the compression spring returns shaft member 11 to the ready position providing the shaft is twisted slightly counterclockwise to avoid overhanging ledge 57. The interconnection of the drawing, displacement and ejection channels permits the automatic pipette to be used in various applications. For example, the displacement channel can be used as a drawing channel to draw a larger volume of liquid into the disposable tip.

A tight but smoothly slidable friction fit is attained between precision plunger 60 and molded precision bore 61 as shown in FIGS. 7 and 8. The fit is obtained by fabricating precision molded bore 61 from a resilient material. Preferably the fit is obtained by placing the precision plunger and a polymerizable liquid in a mold, in the positions the precision plunger and precision molded bore occupy in FIGS. 7 and 8, and then polymerizing the polymerizable liquid about the precision plunger to form the tight but smoothly slidable friction fit. Preferably the resilient material is silicon rubber. In one embodiment the surface of the precision plunger is coated with a thin film of teflon. The smoothly slidable but precise friction fit prevents any contamination of the interior of the automatic pipette if liquid should come in contact with the plunger and if liquid is inadvertently drawn up the precision molded bore. The smoothly slidable but precise friction fit also minimizes the amount of air which is included in the column between the liquid being drawn into the disposable tip and the body of the precision plunger. Further, since the smoothly slidable but precise friction fit is at the very bottom of the pipette possibilities of air leaks are minimized. It is the compressibility of air and the existence of air leaks which creates variations in the actual amount of the liquid being drawn when a large air column is included between a plunger and the liquid being drawn into a pipette of the prior art.

Figures 2, 3:
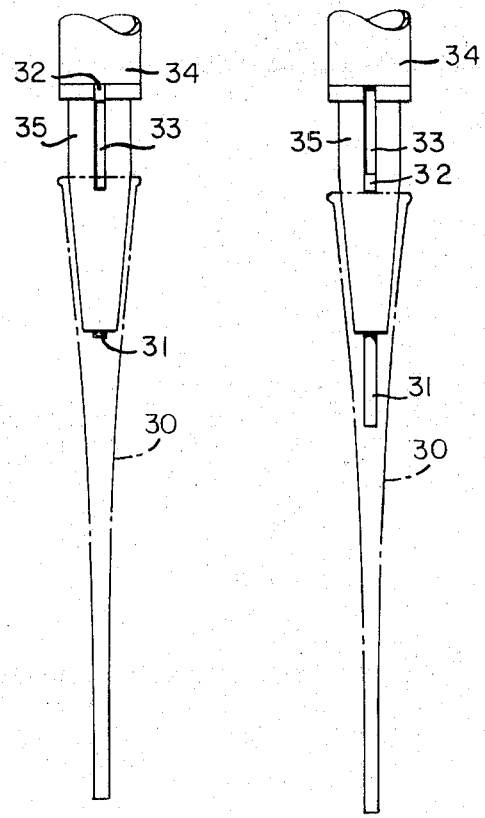
FIG. 2 is a plan view of the lower portion of the precision plunger assembly with a phantom tip in place on the assembly illustrating the finger portion of the tip ejector slide in its normal biased position.
FIG. 3 is also a plan view of the lower portion of the precision plunger assembly illustrating the action of the finger portion of the tip ejector slide as it flicks a disposable tip from the end of the precision plunger assembly.

A tip ejector slide 65 is shown in FIGS. 7 and 8 to ride freely on precision plunger 60. Tip ejector 65 has a finger portion 66 which extends externally from precision plunger assembly 28. Finger portion 66 rides within raceway 67 formed in the surface of precision plunger assembly 28. Tip ejector slide 65 is normally pushed away from the disposable tip by means of spring 63 which is seated in precision molded bore 61. When precision plunger 60 is moved downwardly shoulder 64 abuts tip ejector slide 65 and pushes downwardly. As tip ejector slide 65 is moved downwardly finger portion 66 moves in raceway 67. Finger portion 66 contacts the tip of the disposable tip and flicks it off the end of precision plunger 28 as shown by the action of finger portion 32 in FIGS. 2 and 3.

Figure 4:
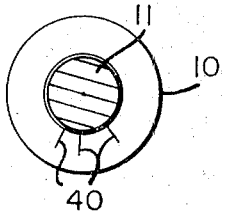
FIG. 4 is a cross-sectional view taken across the upper portion of the shaft member illustrating the indicator marks on the tubular housing for aligning the volume calibration nub on the shaft member.

The utility of the present invention is enhanced by placing external markings 40, shown in FIG. 4, on the top of the upper portion 10 of tubular housing 20 to indicate the locations of the calibration and ejection channels. An indicator, e.g., the indicating arrow 41, shown in FIG. 1, may be placed on shaft member 11 to permit the calibration nub on shaft member 11 to be lined up with the calibration and ejection channels. Shaft member 11 may be switched from channel to channel by a slight torque applied to handle 7. Handle 7 is typically manipulated by placement of a digit, e.g., thumb or index finger in recess 8 and by gripping the circumference with the rest of the hand. FIG. 5 illustrates recess 8 of handle 7 and the volume designation which can be imprinted thereon. A dual designation, such as 4–5µl may be placed thereon if the discharge channel is also used for drawing a liquid.

While a specific embodiment of the automatic pipette of my invention has been described herein my invention is intended to be limited only by the scope and spirit of the appended claims.

I claim:

1. An automatic pipette usable with a disposable tip which when attached to said pipette is disposed to receive the precision plunger from said pipette in a close fit to insure a minimal air column between the bottom of said precision plunger and the top of a liquid column being drawn into said disposable tip, said disposable tip being adapted for accurately drawing and delivering liquids in small quantities, comprising:

a rigid tubular housing;

a shaft member moveable within said tubular housing, said shaft member extending substantially the length of said tubular housing and the upper end of said shaft member extending beyond the upper end of said tubular housing;

a precision plunger assembly attached to the lower end of said tubular housing and including a metallic precision plunger slidable within a precision molded bore in a smoothly slidable precise friction fit, said precision molded bore being made of a resilient material having elastomeric properties similar to those of silicon rubber, the upper end of said precision plunger being attached to the lower end of said shaft member, said precision plunger being retractable at least partially within said plunger assembly by movement of said shaft member within said tubular housing; and a volume calibration nub attached to said shaft member and protruding radially therefrom, said nub being disposed to ride in calibration channels formed in the inner wall of said tubular housing, the longitudinal displacement of said nub in said channels serving to define at least one drawing displacement and at least one discharge displacement for said precision plunger.

2. The automatic pipette of claim 1 wherein said calibration channels are formed in interconnected side-by-side relation to permit said volume calibration nub to be switched from one channel to another at selected stages of a given displacement.

3. The automatic pipette of claim 2 wherein said shaft member is connected to said tubular housing by a spring means which holds said shaft member with attached precision plunger in a ready position until said shaft member is moved downwardly within said tubular housing by application of force on said upper end of said shaft member which extends beyond the upper end of said tubular housing, said spring means returning said shaft member with attached plunger to said ready position after a given displacement.

4. The automatic pipette of claim 3 in combination with a disposable tip insertable over the open end of said precision plunger assembly in a press fit, said disposable tip being disposed to receive said precision plunger.

5. The automatic pipette of claim 4 wherein said precision molded bore is polymerized about said precision plunger.

6. The automatic pipette of claim 5, wherein said precision plunger is coated with a thin film of teflon.

7. The automatic pipette of claim 1 in combination with a tip ejector slide which rides freely on said precision plunger within said precision plunger assembly, said ejector slide having a finger portion which extends externally from said precision plunger assembly through an ejector slide raceway formed therein, a shoulder affixed to said plunger, said shoulder abutting against and pushing said tip ejector slide to force said finger portion to flick a disposable tip off said precision plunger assembly as said volume calibration nub is moved through an ejection displacement in a tip ejection channel.

8. The automatic pipette of claim 7 in combination with a handle means attached to the upper end of said shaft member, said handle means having a recessed surface to accomodate a human digit, position indicators impressed in the upper end of said tubular housing to indicate the position of said calibration channels and said ejection channel, and an indicator on said shaft member to indicate the position of said volume calibration nub.

9. The automatic pipette of claim 1, wherein said resilient material comprising said precision molded bore comprises silicon rubber.

* * * * *